United States Patent [19]
Sato et al.

[11] Patent Number: 5,903,067
[45] Date of Patent: May 11, 1999

[54] POWER SUPPLY APPARATUS FOR ELECTRIC DISCHARGE MACHINE

[75] Inventors: Seiji Sato; Hisashi Yamada, both of Nagoya, Japan

[73] Assignee: Mitsubishi Denki Kabushiki Kaisha, Tokyo, Japan

[21] Appl. No.: 08/993,628

[22] Filed: Dec. 18, 1997

[30] Foreign Application Priority Data

May 12, 1997 [JP] Japan .................................. 9-121284

[51] Int. Cl.$^6$ ...................................................... B23H 1/02
[52] U.S. Cl. ...................... 307/113; 307/115; 219/69.11; 219/69.13; 219/69.16; 219/69.19
[58] Field of Search .............................. 307/113, 52, 53, 307/115; 219/69.11, 69.13, 69.18, 69.19, 69.16; 337/25; 361/199

[56] References Cited

U.S. PATENT DOCUMENTS

| | | | |
|---|---|---|---|
| 4,395,612 | 7/1983 | Izumiya | 219/69.18 |
| 4,447,713 | 5/1984 | Tsurumoto et al. | 219/69.19 |
| 5,329,088 | 7/1994 | Kaitani et al. | 219/69.18 |
| 5,416,290 | 5/1995 | Magara et al. | 219/69.18 |
| 5,770,831 | 6/1998 | Kancko et al. | 219/69.18 |

Primary Examiner—Jeffrey Gaffin
Assistant Examiner—Albert W. Paladini
Attorney, Agent, or Firm—Sughrue, Mion, Zinn, Macpeak & Seas, PLLC

[57] ABSTRACT

A power supply apparatus for an electric discharge machine comprises a first power supply device comprising a high impedance circuit connected in series to a DC power supply unit and a second power supply device comprising a low impedance circuit, intermittently applies a pulse voltage to a space between a tool electrode and a workpiece opposite to the tool electrode with a specified gap therebetween from the first power supply device, and also supplies a machining current to the space from the second power supply device after generation of electric discharge, in which the second power supply device provides therein a plurality units of switching devices connected in parallel to each other, the number of ON-units switching circuit for controlling the number of switching devices to be simultaneously turned ON, and an ON-time control unit for variably controlling ON-time of the switching devices.

6 Claims, 11 Drawing Sheets

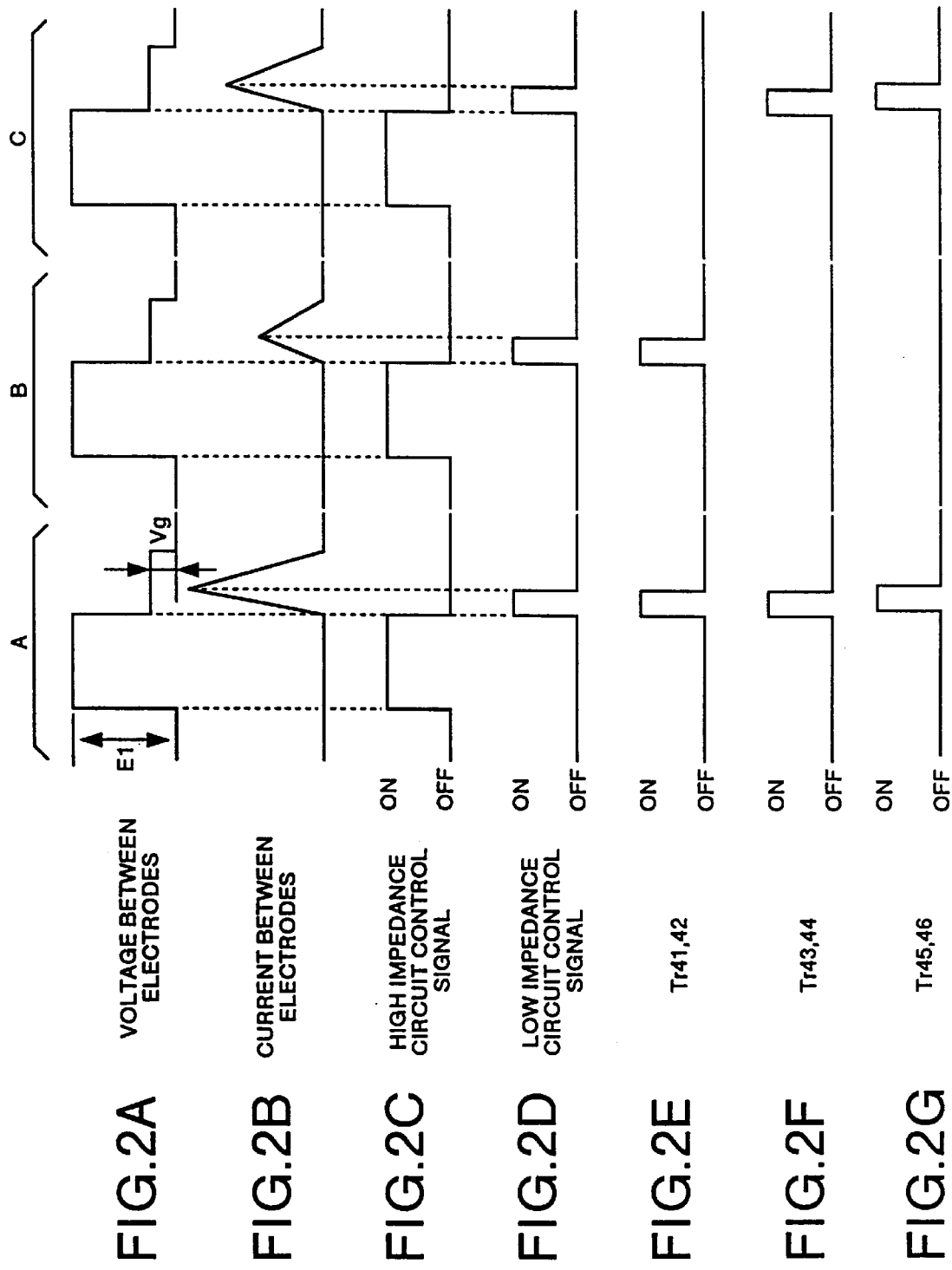

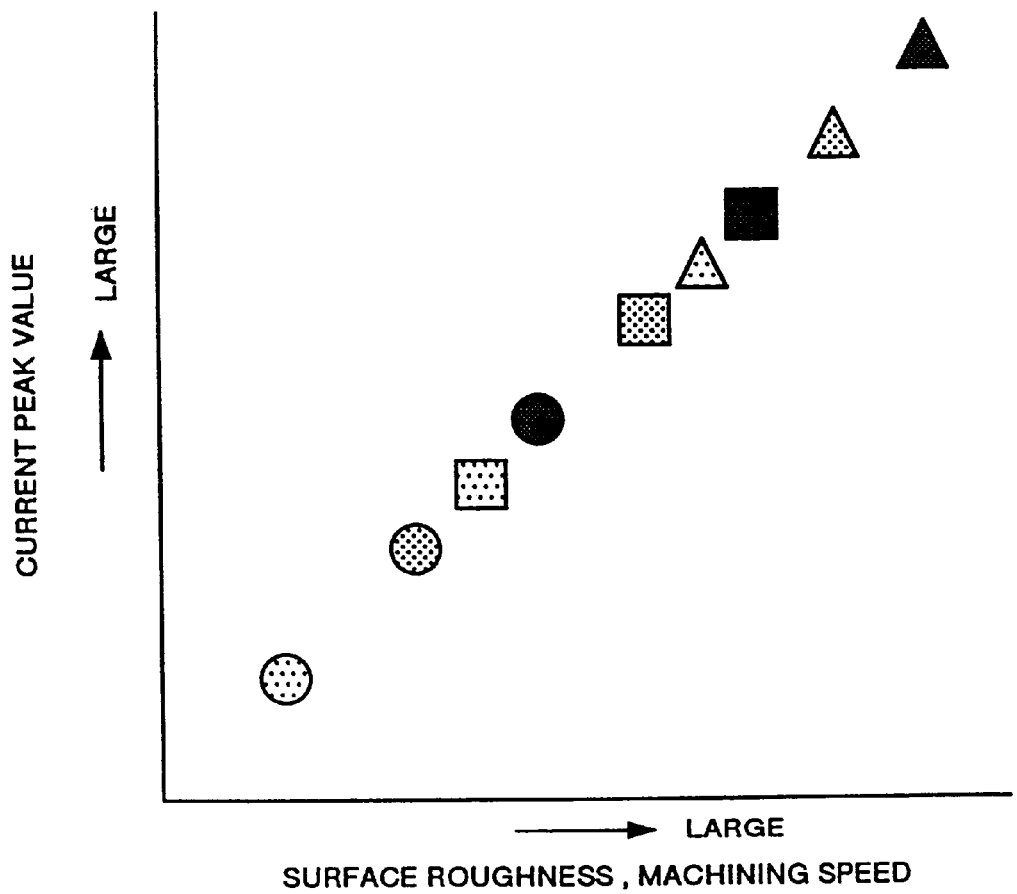

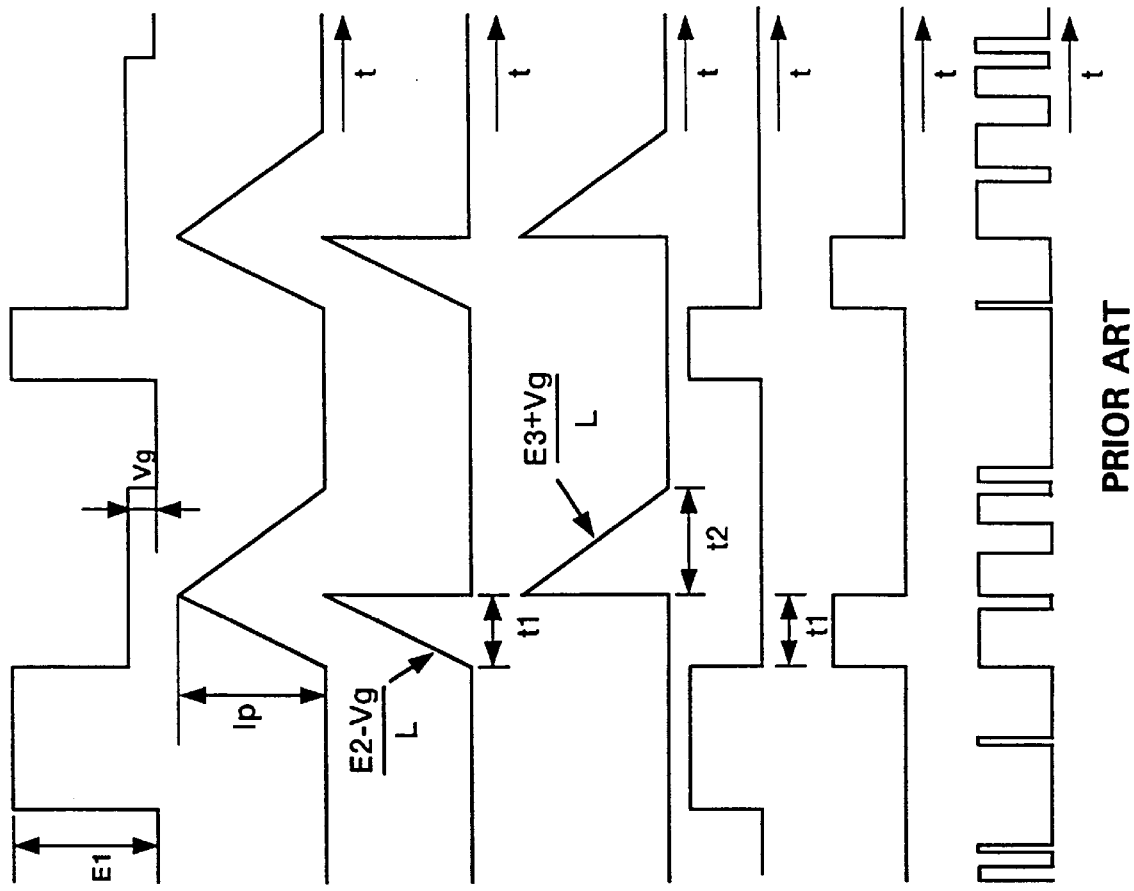

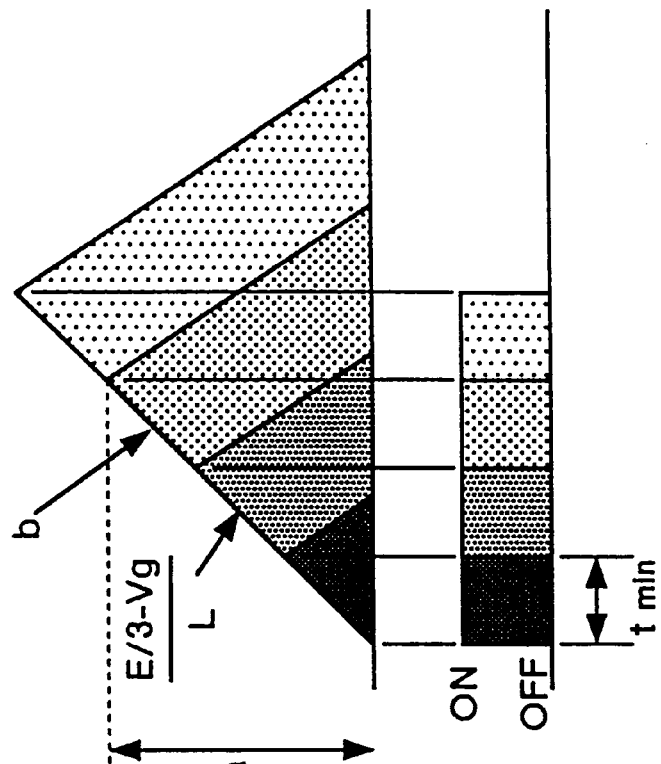
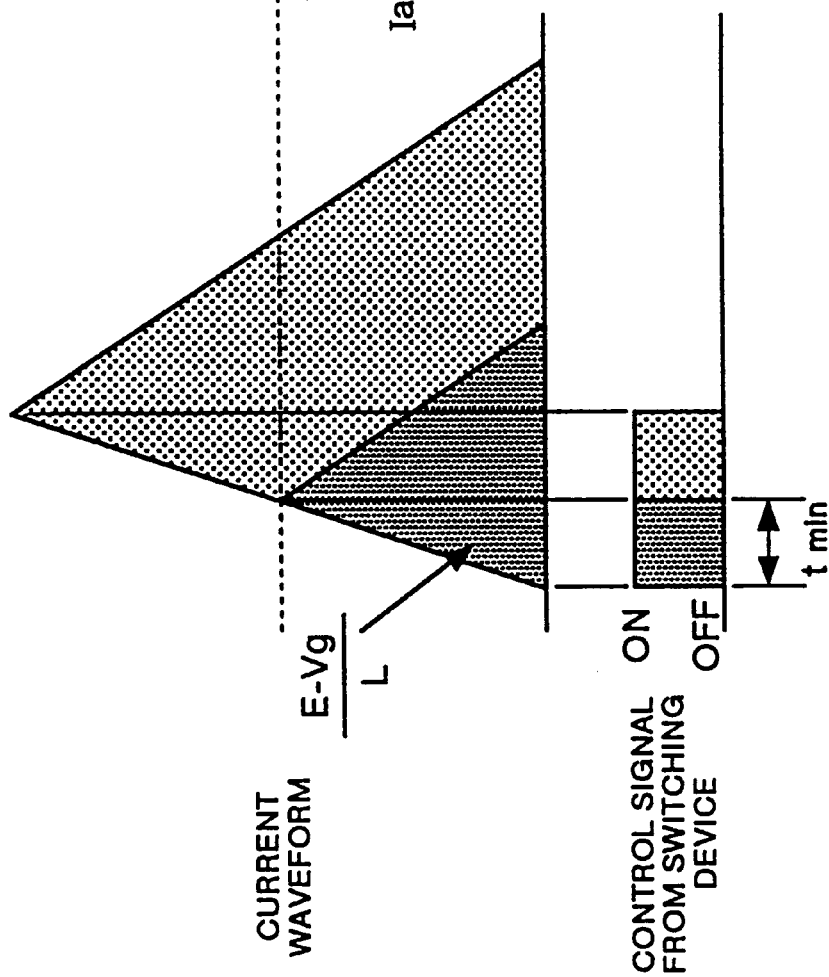

NUMBER OF SWITCHING DEVICES
TO BE SIMULTANEOUSLY TURNED ON

PRIOR ART

POWER SUPPLY APPARATUS FOR ELECTRIC DISCHARGE MACHINE

FIELD OF THE INVENTION

The present invention relates to a power supply apparatus for an electric discharge machine and more particularly to a power supply apparatus for an electric discharge machine especially for a wire electric discharge machine.

BACKGROUND OF THE INVENTION

It has been considered that use of a power supply unit which can generate a current pulse with a high peak and with a narrow pulse width as a power supply unit for machining is the best way to improve a machining speed of electric discharge machining. For this reason, an FET is generally used as a switching device, and a plurality of FETs are connected in parallel to each other to supply a large current to a space between the electrodes by directly turning ON/OFF a current passing therethrough with a switching circuit.

Also, a power supply circuit comprises two units of switching circuit, namely a high impedance circuit which has a small current peak value and only supplies a voltage to a space between electrodes and a low impedance circuit which has a large current peak value, and a uniform discharge current is formed by at first applying a voltage to a space between electrodes with the high impedance circuit and then closing the low impedance circuit for a specified period of time after the generation of electric discharge is detected to flow a desired current therethrough, whereby a machining speed to surface roughness is improved.

FIG. 8 shows one example of a power supply apparatus for an electric discharge machine based on the conventional technology. This power supply apparatus has a high impedance circuit 10 and a low impedance circuit 20, and both of the high impedance circuit 10 and the low impedance circuit 20 are connected to a tool electrode 1 as well as to a workpiece W each as a power supply circuit. Each of the power supply circuits includes floating inductance L due to wiring or the like in the circuit.

The high impedance circuit 10 comprises a DC power supply unit 101, a semiconductor switching device 102, a control unit 103 for controlling ON/OFF of the semiconductor switching device 102, a diode 104, and a resistor 105 for restricting a current in the high impedance circuit 10.

The low impedance circuit 20 comprises a DC power supply unit 201, a semiconductor switching device 202, a control unit 203 for turning ON/OFF the semiconductor switching device 202, a diode 204, and a constant-voltage circuit 205. The constant-voltage circuit 205 comprises a capacitor 206 placed on an input side, a switching device 207 for the constant-voltage circuit, a control unit 208 for controlling ON/OFF of the switching device 207 for the constant-voltage circuit, and a resistor 209.

Next description is made for operations of the power supply apparatus for an electric discharge machine having the configuration as described above with reference to FIGS. 9A to 9G.

When the switching device 102 in the high impedance circuit 10 is tuned ON, a voltage E1 as shown in FIG. 9A is applied to the space between the electrodes. Insulation between the electrodes formed by the tool electrode 1 and the workpiece W is broken down by the voltage E1, and then electric discharge is generated therebetween. The switching device 202 in the low impedance circuit 20 is tuned ON when the generation of electric discharge is detected and a large current is supplied to the space therebetween, whereby electric discharge machining is carried out.

In a state in which the electric discharge has been generated between the electrodes and a discharge current is flowing, the voltage therebetween maintains an arc potential Vg (around 20 V).

FIGS. 9E, 9F and 9G show ON/OFF states of the switching devices 102, 202, 207, respectively.

Herein detailed description is made for a current waveform of the low impedance circuit 20 at the time when the circuit is turned ON or OFF. A circuit from the DC power supply unit 201 to the space between the tool electrode 1 and the workpiece W in the low impedance circuit 20 is a non-resistance circuit not including a resistor or the like excluding the semiconductor switching device 202. Accordingly, when the switching device 202 is ON, if the insulation between the tool electrode 1 and the workpiece W is broken down, a current flows, but the current at that time rises at a slope decided by a voltage E2 of the DC power supply unit 201 and also floating inductance L in the circuit.

Herein, even if it is assumed that the switching device 202 is an ideal one with the turn-OFF time of zero, even when the switching device 202 is changed from ON to OFF, a current can not be reduced to zero even momentarily because of some energy accumulated in the inductance in the line. For this reason, so-called a surge voltage is generated at the both edges of the switching device 202, a current charging the capacitor 206 in the constant-voltage circuit 205 flows through the diode 204, and the voltage of the capacitor 206 increases.

The constant-voltage circuit 205 is constructed so as to control a duty ratio of ON/OFF of the switching device 207 so that the voltage of the capacitor 206 becomes constant, and the energy temporarily accumulated in the capacitor 206 is eventually consumed by the resistor 209.

A current I flowing through the electrodes is expressed by a sum of a current I1 flowing through the switching device 202 and a current I2 flown in the diode 204, which is shown in FIGS. 9B, 9C and 9D, respectively.

A slope of a rise of a current when the switching device 202 is tuned ON is expressed by the following expression:

$$(E2-Vg)/L$$

and a slope of a fall of the current at the time of turning OFF is expressed as follows:

$$(E3+Vg)/L$$

wherein designated at the sign E2 is a voltage of the DC power supply unit 201, at E3 a voltage in the constant-voltage circuit 205, at Vg an arc voltage between the electrodes, and at L an inductance in the line.

In summary, after the high impedance circuit 10 is turned ON, electric discharge is generated between the electrodes, and when the switching device 202 in the low impedance circuit 20 is turned ON, a peak current expressed by the following expression flows between the electrodes after an ON-time t1 has passed:

$$Ip=(E1-Vg)t1/L$$

and machining is performed.

There are some other ones, as a power supply apparatus for an electric discharge machine based on the conventional technology other than the power supply apparatus for an electric discharge machine shown in FIG. 8, disclosed in Japanese Patent Laid-Open Publication No. SHO 49-118097, in Japanese Patent Laid-Open Publication No. HEI 5-84609, and in Japanese Patent Laid-Open Publication No. SHO 63-7225.

The power supply apparatus for an electric discharge machine based on the conventional technology (shown in FIG. 8) has the configuration as described above, so that, to improve a machining speed, it is required to make larger the number of switching devices connected to each other in parallel to generate a pulse with a high current peak value.

However, in electric discharge machining, generally finishing is performed after rough machining is carried out, and in finishing, machining is executed at a pulse with a low machining current value to improve machining precision and machined surface roughness in the finishing. Accordingly, as far as the number of switching devices is concerned, the object to improve a machining speed is contradictory to an object to improve machining precision.

For this reason, it is difficult to achieve both of the improvement in machining speed and that in machining precision in the same power supply apparatus, therefore two types of power supply apparatus have to be used for finishing at a low peak current and for roughing at a high peak current.

Also, in a fine electrode with a wire diameter of φ 0.15 mm or less, when a power supply apparatus with a high current peak value is used, a current peak value is too high as a machining condition for roughing so that a wire is cut off and machining can not be executed. Also, in this case, in the low peak power supply apparatus for finishing, a machining speed is too slow to practically be used.

Conventionally, when roughing a workpiece with a fine electrode with a wire dimension of φ0.15 mm or less, the above problems have been dealt with a method of making a current peak value smaller by decreasing a supply voltage of the DC power supply unit in the switching circuit or the like.

A current peak value is expressed by the following expression, $Ip=(E1-Vg)t1/L$, so that, if a supply voltage E is made to $1/3$, a peak current in a minimum set time can be suppressed to around $1/3$. FIG. 10A shows a current waveform at a normal time when the supply voltage E is used as it is, and FIG. 10B shows a current waveform in a case where the power supply voltage E has been suppressed to $1/3$ respectively. It should be noted that, in FIGS. 10A and 10B, tmin indicates a width of a minimum ON time to be set for a switching device.

However, when a supply voltage in the switching circuit is decreased, a rise of a current peak voltage becomes dull, deposition of a wire electrode onto a workpiece is generated, and a machined groove is filled with the deposited materials, which makes it impossible to continue machining. In addition, to decrease a supply voltage in the switching circuit, it is required to have a plurality of DC power supply units, whereby problems in aspects of space-saving and costs become more serious.

In the electric discharge machine disclosed in the Japanese Patent Laid-Open Publication No. SHO 49-118097 or in Japanese Patent Laid-Open Publication No. HEI 5-84609, consumption of a tool electrode is suppressed by gradually increasing the number of switching devices to be ON. But, in each of the electric discharge machine according to those inventions, although some effects can be achieved in an area in which a pulse width is very wide, when it is used in finishing in wire electric discharge machining and in roughing with a fine electrode, largely different from a machining a wire electric discharge machine with a high peak and a small pulse width, none of the problems such as generation of a wire to be cut off or deposition of an electrode material onto a workpiece can be solved.

Also, the electric discharge machine disclosed in Japanese Patent Laid-Open Publication No. SHO 63-7225 has configuration in which a plurality units of switching device in the main power supply circuit are connected in parallel to each other, and the number of parallel circuits is changed by a driving circuit for discretely driving a parallel device group by a control signal from the control unit according to a state of electric discharging between a workpiece and a wire electrode, and machining is executed by a discharge current according to an electric discharging state between the electrodes. In this electric discharge machine, in a case where electric discharging is used in finishing such as a second cut, the number of switching devices to be simultaneously tuned ON is selectively controlled, so that machining can be performed at a current peak value suited for the finishing condition.

However, there is a relation as shown in FIG. 11 between the number of switching devices to be simultaneously tuned ON connected in parallel to each other and a current peak value, so that, even if the number of switching devices to be simultaneously tuned ON is increased, a current peak value is not always increased linearly in accordance with increase of the number of ON-units thereof. Namely, even if the number of the switching devices connected in parallel to each other (the number of units to be simultaneously turned ON) is decreased to $1/10$, a current peak value of $1/10$ of that when all of the switching devices is simultaneously tuned ON can not always be obtained.

It is well known that there is a nonlinear relation between the number of parallel units and a current peak as described above. Namely, a current peak becomes discrete, as shown in FIG. 12, when control is provided only by increasing or decreasing the number of switching devices (the number of units to be simultaneously turned ON), so that it is difficult to apply the control system to machining conditions in a broad range from machining with a fine wire to roughing with a wire electrode with the thickness of around φ 0.2 mm.

Also, as shown in the example of the conventional technology in FIG. 8, a current peak value becomes discrete, when control is provided by controlling an ON time of the switching device, in machining with a fine wire as an electrode, as described above.

SUMMARY OF THE INVENTION

It is an object of the present invention to obtain a power supply apparatus for an electric discharge machine which enables power supply under electric conditions each applicable in a different range such as those where a high peak current is used for roughing with a wire electric discharge machining, and those where a low peak current is used for finishing and roughing with a fine wire electrode.

Especially, the present invention aims to obtain a power supply apparatus for an electric discharge machine which can respond to a wide range of machining conditions including machining with a fine wire electrode by making a current peak continuous based on the fact that it is effective, in control of a current peak value, to simultaneously control a current pulse width and control of the number of devices provided in order to continuously control a current peak in response to various machining conditions.

To achieve the object described above, the power supply apparatus for an electric discharge machine according to the present invention comprises a first power supply device comprising a high impedance circuit connected in series to a DC power supply unit and a second power supply device comprising a low impedance circuit, intermittently applies a pulse voltage to a space between a tool electrode and a workpiece opposite to the tool electrode with a specified gap therebetween from the first power supply device, and also supplies a machining current to the space from the second power supply device after generation of electric discharge, and the second power supply device comprises a plurality units of switching devices connected in parallel to each other, the number of ON-units switching means for controlling the number of switching devices to be simultaneously turned ON, and an ON-time controlling means for variably controlling ON-time of the switching devices.

In the power supply apparatus for an electric discharge machine according to the above invention, the number of ON-units switching means controls the number of switching devices to be simultaneously turned ON, and the ON-time controlling means variably controls ON-time of the switching devices.

In the power supply apparatus for an electric discharge machine according to another feature of the present invention, the power supply apparatus for an electric discharge machine according to the above invention comprises a simultaneous ON-patterns switching means for switching and using switching devices to be turned ON in a case where the switching devices to be simultaneously turned ON are restricted by the number of ON-units switching means.

In the power supply apparatus for an electric discharge machine according to the above invention, the simultaneous ON-patterns switching means switches and uses switching devices to be turned ON in a case where the switching devices to be simultaneously turned ON are restricted by the number of ON-units switching means.

In the power supply apparatus for an electric discharge machine according to another feature of the present invention, the power supply apparatus for an electric discharge machine according to the above invention, the simultaneous ON-patterns switching means comprises a simultaneous ON-combination random setting means for setting at random a combination of switching devices to be simultaneously tuned ON.

In the power supply apparatus for an electric discharge machine according to the above invention, the simultaneous ON-combination random setting means sets at random a combination of switching devices to be simultaneously tuned ON.

Other objects and features of this invention will become understood from the following description with reference to the accompanying drawings.

BRIEF DESCRIPTION OF THE DRAWINGS

FIGS. 2A to 2G are timing charts showing operations in Embodiment 1;

FIG. 4A is a table showing combinations each between the number of switching devices to be simultaneously turned ON and the ON time, and FIG. 4B is a graph showing a relation between a current peak values and surface roughness/a machining speed;

FIGS. 9A to 9G are timing charts showing operations in the example based on the conventional technology;

FIGS. 10A and 10B are graphs showing a relation between a supply voltage and the current peak;

DESCRIPTION OF THE PREFERRED EMBODIMENT

Figure 1:
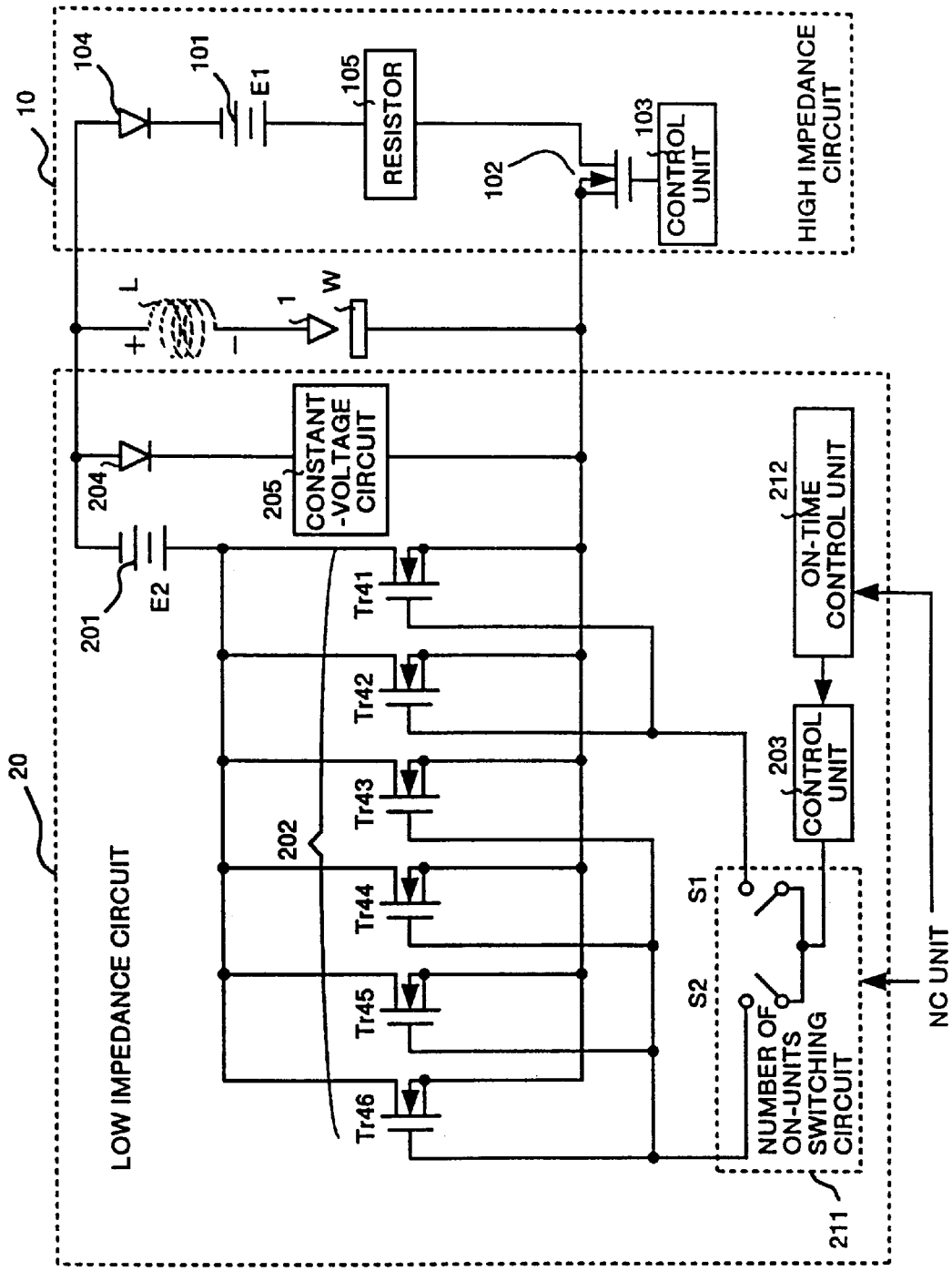
FIG. 1 is a circuit diagram showing Embodiment 1 of the power supply apparatus for an electric discharge machine according to the present invention.

Detailed description is made hereinafter for embodiments of the power supply apparatus for an electric discharge machine according to the present invention with reference to the attached drawings. It should be noted that, in the embodiments described later, the same reference numerals are assigned to the same sections corresponding to those in the example based on the conventional technology, and description thereof is omitted herein.

FIG. 1 shows Embodiment 1 of the power supply apparatus for an electric discharge machine (a wire electric discharge machine) according to the present invention. A semiconductor switching device 202 in the low impedance circuit 20 comprises a plurality of switching transistors Tr41 to Tr46 connected in parallel to each other.

Provided in the low impedance circuit 20 are the number of ON-units switching circuit 211 and an ON-time control unit 212.

The number of ON-units switching circuit 211 switches the number of switching transistors Tr41 to Tr46 to be simultaneously turned ON according to an instruction signal from an NC unit which is not shown in the figure. In the example shown in the figure, the number of units to be simultaneously turned ON is set to 2 when only a switch S1 is closed, and the number of units to be simultaneously turned ON is set to 4 when only a switch S2 is closed, while the number of units to be simultaneously turned ON is set to 6 (the maximum value) when both of the switches S1 and S2 are closed.

The ON-time control unit 212 variably controls ON-time of the semiconductor switching device 202 according to an instruction signal from the numerical controller (NC) unit which is not shown in the figure.

Next description is made for operations in Embodiment 1 with reference to FIGS. 2A to 2G.

Description is made herein for operations in a case where a minimum value (tmin) is selected as ON time for the semiconductor switching devices 202 (switching transistors Tr41 to Tr46) by the ON-time control unit 212.

In a case where a machining condition requiring a high peak current is selected by the NC unit, both of the switches S1 and S2 in the number of ON-units switching circuit 211 are closed, the number of units to be simultaneously turned ON is set to a maximum value, and all of the switching transistors Tr41 to Tr46 in the low impedance circuit 20 is simultaneously turned ON or OFF, so that a large current is supplied to a space between the electrodes.

At first, when the semiconductor switching device 102 in the high impedance circuit 10 is tuned ON according to a control signal onto the high impedance circuit as shown in FIG. 2C, a voltage E1 is applied to the space therebetween as shown in FIG. 2A.

When inter-polar insulation between a tool electrode 1 and a workpiece W is broken down by the voltage E1 and generation of electric discharge is detected, all the switching transistors Tr41 to Tr46 in the semiconductor switching device 202 in the low impedance circuit 20 are turned ON at the same time, as shown by A in FIGS. 2E to 2G, according to a control signal onto the low impedance circuit as shown in FIG. 2D. With the above operation, a high peak current as shown by A in FIG. 2B is supplied to the space therebetween.

Description is made herein for operations in a case where a minimum value (tmin) is selected as ON time for the semiconductor switching devices 202 (switching transistors Tr41 to Tr46) by the ON-time control unit 212.

In a case where a machining condition requiring a low peak current is selected by the NC unit, only the switch S1 in the number of ON-units switching circuit 211 is closed, the number of units to be simultaneously turned ON is set to 2, and a current peak value is adjusted by decreasing the number of units to be simultaneously turned ON in the switching transistors Tr41 to Tr46 connected in parallel to each other in the low impedance circuit 20.

Also in this case, when the semiconductor switching device 102 in the high impedance circuit 10 is tuned ON according to a control signal onto the high impedance circuit as shown in FIG. 2C, the voltage E1 is applied to the space therebetween as shown in FIG. 2A.

When insulation between the electrodes formed by the tool electrode 1 and the workpiece W is broken down by the voltage E1 and generation of electric discharge is detected, only the switching transistors Tr41 and Tr42 in the semiconductor switching device 202 in the low impedance circuit 20 are turned ON at the same time, as shown by B in FIG. 2E to 2G, according to a control signal onto the low impedance circuit as shown in FIG. 2D. With the above operation, a current with a low peak value as shown by B in FIG. 2B flows to the space therebetween.

Description is made herein for operations in a case where a minimum value (tmin) is selected as ON time for the semiconductor switching devices 202 (switching transistors Tr41 to Tr46) by the ON-time control unit 212.

In a case where a machining condition requiring a medium peak current is selected by the NC unit, only the switch S2 in the number of ON-units switching circuit 211 is closed, the number of units to be simultaneously turned ON is set to 4, and a current peak value is adjusted by adjusting the number of units to be simultaneously turned ON in the switching transistors Tr41 to Tr46 connected in parallel to each other in the low impedance circuit 20.

Also in this case, when the semiconductor switching device 102 in the high impedance circuit 10 is tuned ON according to a control signal onto the high impedance circuit as shown in FIG. 2C, the voltage E1 is applied to the space therebetween as shown in FIG. 2A.

When insulation between the electrodes formed by the tool electrode 1 and the workpiece W is broken down by the voltage E1 and generation of electric discharge is detected, the switching transistors Tr43 to Tr46 in the semiconductor switching device 202 in the low impedance circuit 20 are turned ON at the same time, as shown by C in FIG. 2E to 2G, according to a control signal onto the low impedance circuit as shown in FIG. 2D. With the above operation, as shown in FIG. 2B, an inter-polar current with a intermediate peak value in a case where the number of units to be simultaneously turned ON is 2 or 6 flows.

Description is made for a case where the ON-time control unit 212 selects time (t2) twice as long as the time tmin (t1). Operations of the circuit are carried out like those described above, and ON time of the switching devices Tr43 to Tr46 becomes twice as long as the time tmin (t1), so that a current peak value also becomes around twice as large as the case of tmin (t1) in terms of the obtained current peak value.

Figure 3A:
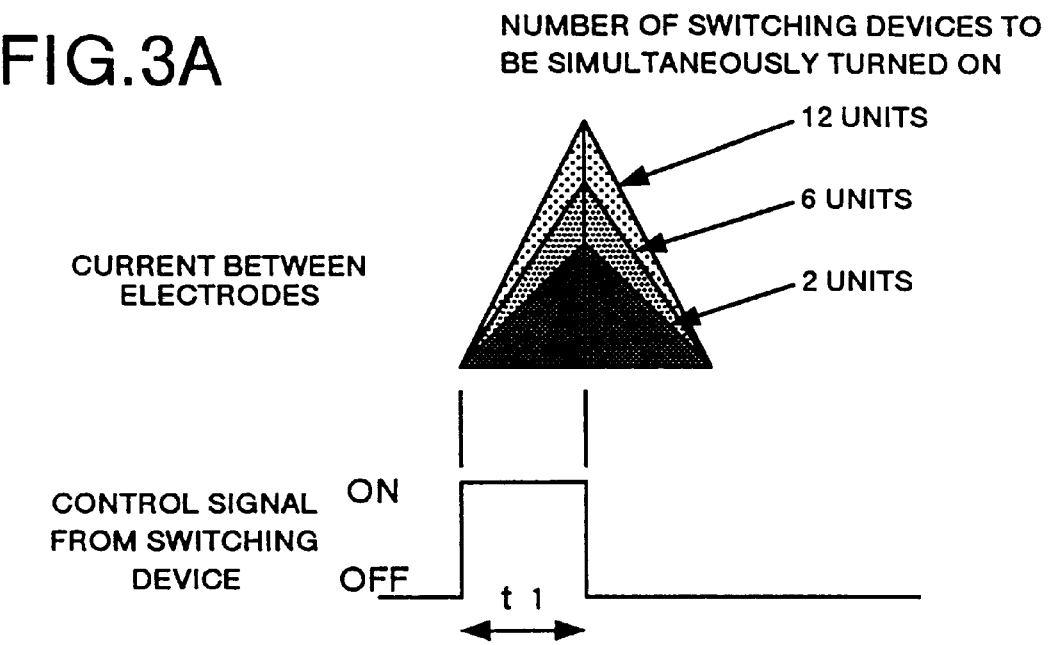
FIGS. 3A and 3B are graphs showing a relation between the number of switching devices to be simultaneously turned ON and the current peak values.
Figure 3B:
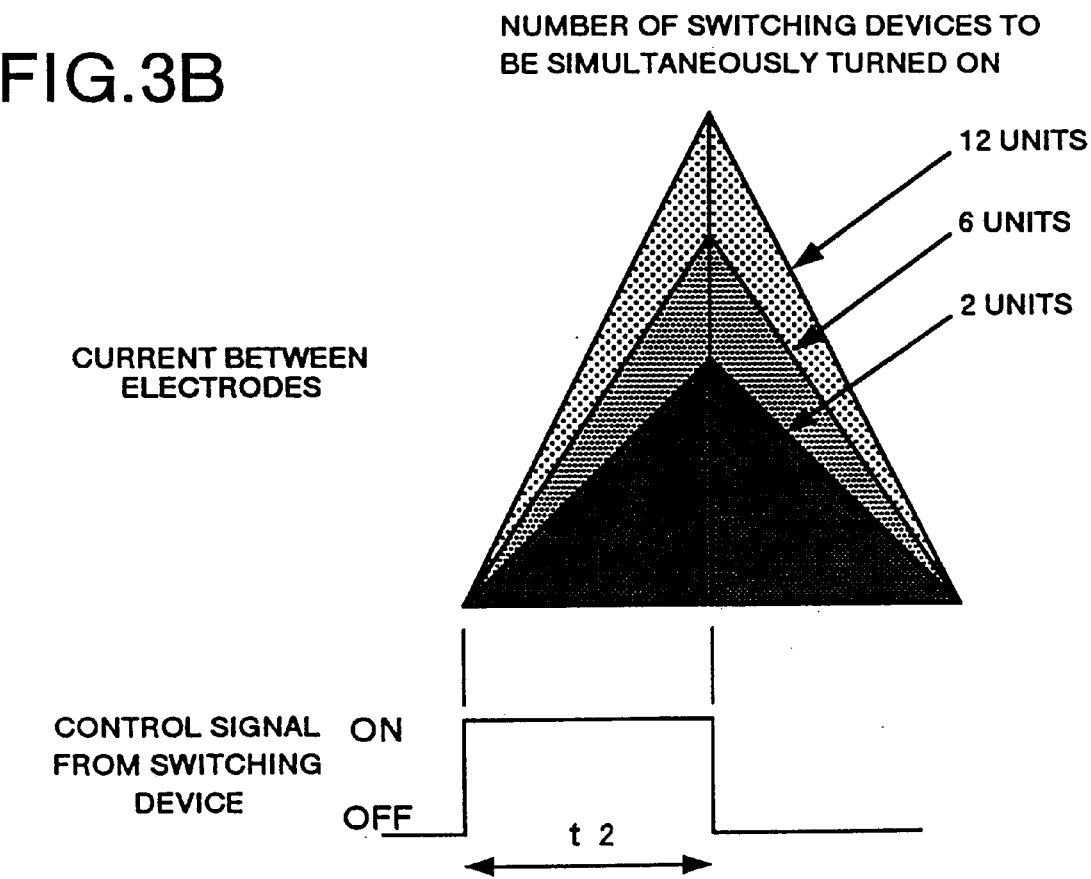

As for a relation between the number of switching devices (switching transistors) to be simultaneously turned ON and a current peak value, when ON time of the switching devices is t1, the value as shown in FIG. 3A is obtained, and if ON time of the switching device is as follows:

$$t2\ (t2=2\times t1)$$

the current peak value becomes twice as high as the time t1 as shown in FIG. 3B.

In a case where the ON time of the switching device is either t1 or t2, assuming that a current peak value in a case where the number of simultaneous ON units of the switching device is 12 is set to 1, the current peak value becomes around 0.5 with 2 simultaneous ON-units, so that it is possible to control and change the number of devices to be simultaneously turned ON, although a current peak value can not be reduced to ½ by reducing the number of switching devices to be simultaneously turned ON to ½ of the original number of units.

As understood from the above description, as shown in FIG. 4A, by combining control of the number of switching devices to be simultaneously turned ON with control of ON time of the switching devices, it is possible to obtain, as shown in FIG. 4B, continuous current peak values suited to a machining range from a condition requiring a low peak value to a condition requiring a high peak value with smaller steps as compared to that in a case where control is provided with either one of the two types of control described above.

As described above, by combining control of the number of switching devices to be simultaneously turned ON which are connected in parallel to each other in the low impedance circuit with that of ON time of the switching devices, a current peak value can variably be controlled for a machining condition requiring a low current peak although it is a machining power supply unit for a high peak current. As described above, a current waveform when a current peak value is suppressed by controlling the number of switching devices to be simultaneously turned ON can make ON time of the switching devices shorter, than that in a case where a current peak is suppressed by reducing a voltage of a DC power supply unit in the switching circuit, as shown in FIGS. 9A to 9G, when compared at the substantially same peak value, so that deposition of an electrode material onto a workpiece hardly occurs and a machining speed is improved.

Accordingly, the machining power unit for a high current peak can be used as the machining power unit for a low current peak for finishing or for machining with a fine wire electrode without degradation of the machining characteristics, so that significant effects can be obtained in aspects of cost reduction and space saving.

Figure 5:
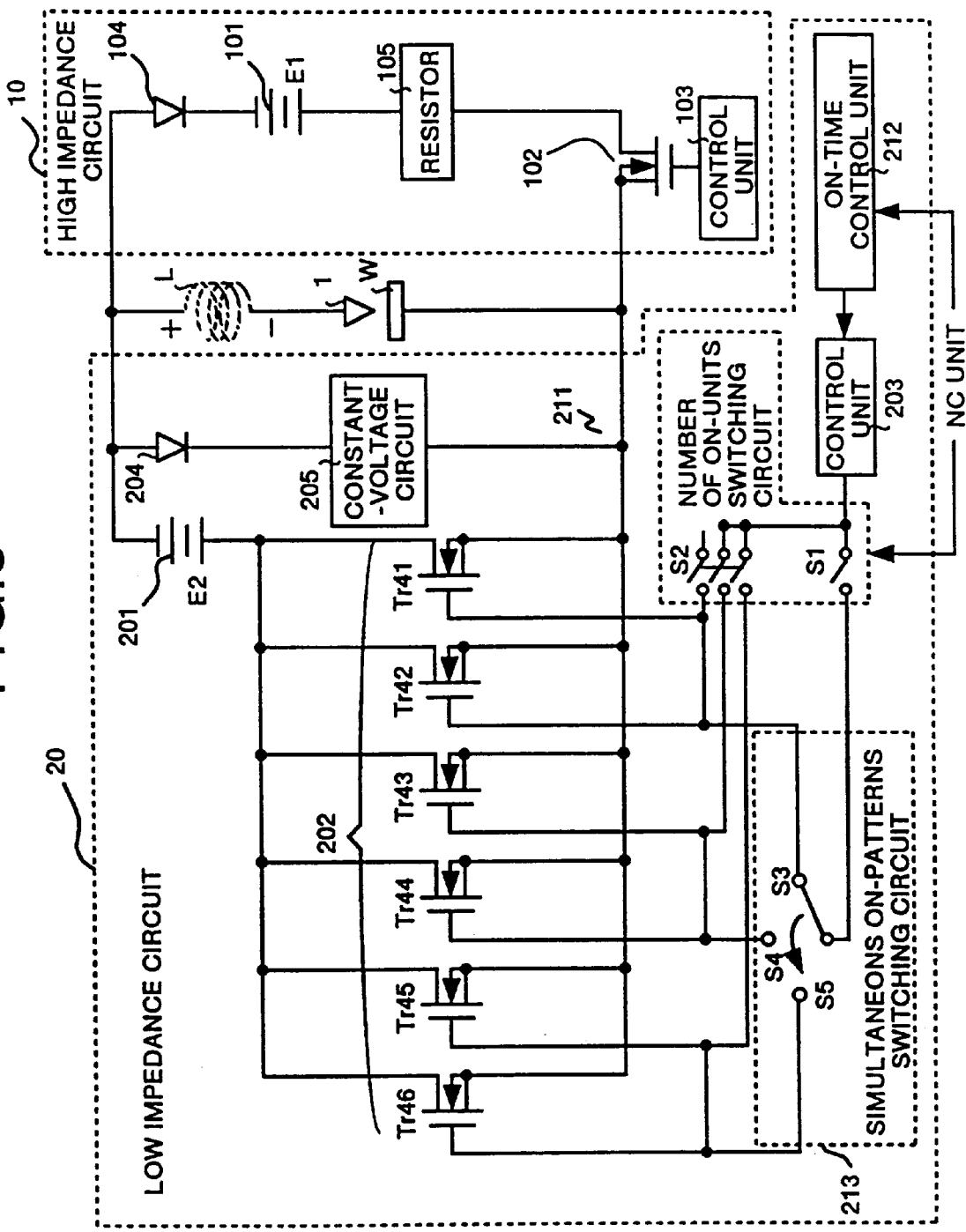
FIG. 5 is a circuit diagram showing Embodiment 2 of the power supply apparatus for an electric discharge machine according to the present invention.

FIG. 5 shows Embodiment 2 of the power supply apparatus for an electric discharge machine (a wire electric discharge machine) according to the present invention. It should be noted that, in FIG. 5, the same reference numerals are assigned to the sections corresponding to those in FIG. 1 and description thereof is omitted herein.

The low impedance circuit 20 comprises a simultaneous ON-patterns switching circuit 213 in addition to the number of ON-units switching circuit 211 and the ON-time control unit 212.

The number of ON-units switching circuit 211 switches, like in a case of Embodiment 1, the number of switching transistors Tr41 to Tr46 to be simultaneously turned ON according to an instruction signal from the NC unit which is not shown in the figure, and in Embodiment 2, the number of units to be simultaneously turned ON is set to 2 when only the switch S1 is closed, and the number of units to be simultaneously turned ON is set to 6 (the maximum value) when only the switch S2 is closed.

The simultaneous ON-patterns switching circuit 213 effectively functions in a case where only the switch S1 in the number of ON-units switching circuit 211 is closed and the number of units to be simultaneously turned ON is 2, while the switching transistors Tr41, 42 are selected when the switch S3 is closed, the switching transistors Tr43, 44 are selected when the switch S4 is closed, and the switching transistors Tr45, 46 are selected when the switch S5 is closed.

The simultaneous ON-patterns switching circuit 213 is rotationally switched, when the number of units to be simultaneously turned ON is set to 2, in the order of S3→S4→S5→S3 for each 1 pulse. With the above operations, in a case where the number of units to be simultaneously turned ON is set to 2, it is possible to prevent only some among the switching transistors from being used, so that a life of devices is not shortened.

Next description is made for operations in Embodiment 2 with reference to FIGS. 6A to 6G.

Description is made herein for operations in a case where a minimum value (tmin) has been selected as ON time for the semiconductor switching devices 202 (switching transistors Tr41 to Tr46) by the ON-time control unit 212.

In a case where a machining condition requiring a high peak current is selected by the NC unit, the switch S2 in the number of ON-units switching circuit 211 is closed, the number of units to be simultaneously turned ON is set to the maximum value, and all of the switching transistors Tr41 to Tr46 in the low impedance circuit 20 is simultaneously turned ON or OFF, so that a large current is supplied to a space between the electrodes.

Figure 6:
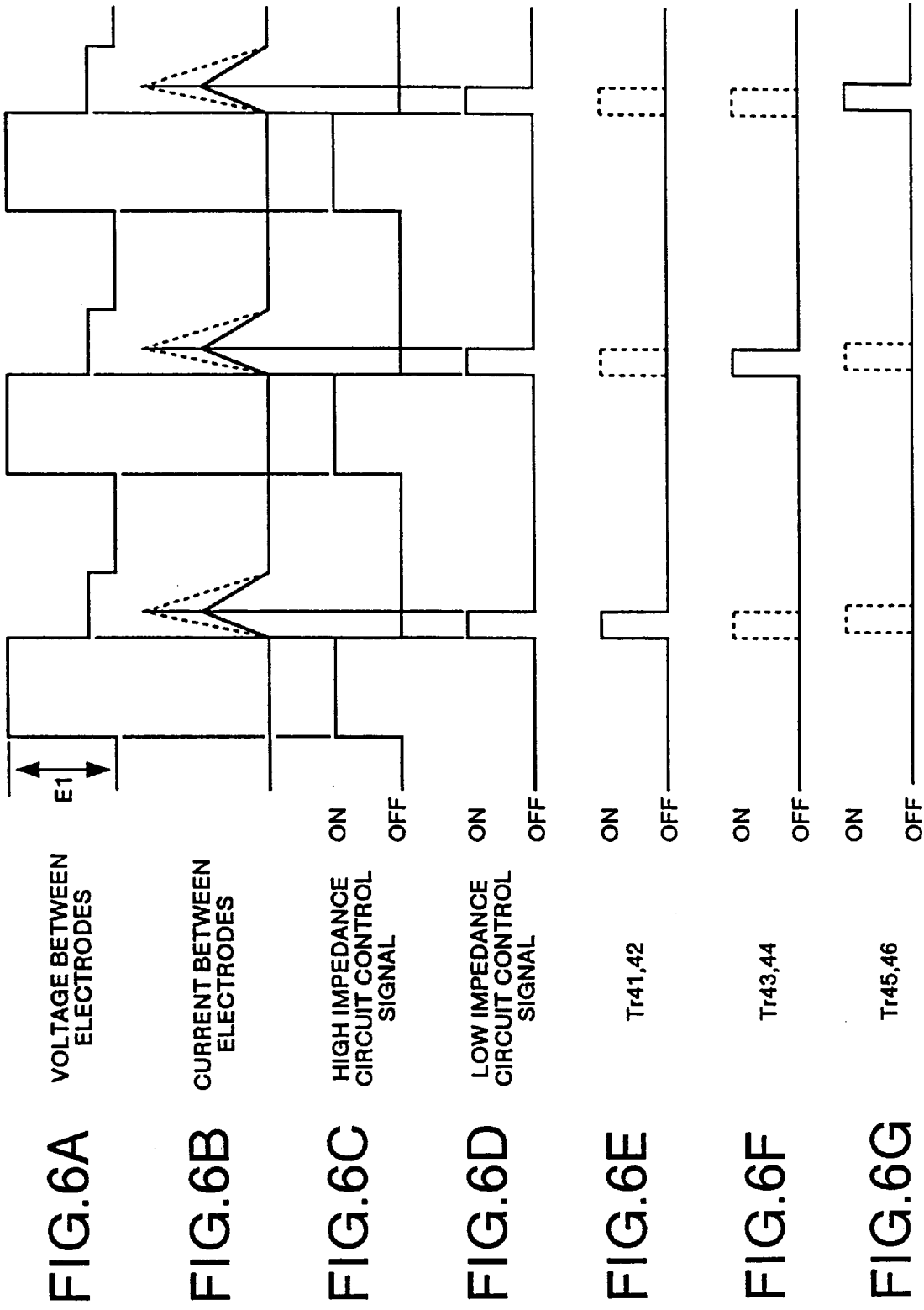
FIGS. 6A to 6G are timing charts showing operations in Embodiment 2.

At first, when the semiconductor switching device 102 in the high impedance circuit 10 is tuned ON according to a control signal onto the high impedance circuit as shown in FIG. 6C, a voltage E1 is applied to the space therebetween as shown in FIG. 6A.

When insulation between the electrodes formed by a tool electrode 1 and a workpiece W is broken down by the voltage E1 and generation of electric discharge is detected, all the switching transistors Tr41 to Tr46 in the semiconductor switching device 202 in the low impedance circuit 20 are turned ON at the same time, as shown in FIG. 6E to 6G (a broken line is included), according to a control signal onto the low I impedance circuit as shown in FIG. 6D. With the above operation, a high peak current as indicated by the broken line in FIG. 6B is supplied to the space therebetween.

Description is made herein for operations when a minimum value (tmin) is selected as ON time for the semiconductor switching devices 202 (switching transistors Tr41 to Tr46) by the ON-time control unit 212.

When a machining condition requiring a low peak current is selected by the NC unit, the switch S1 in the number of ON-units switching circuit 211 is closed, the number of units to be simultaneously turned ON is set to 2, and a current peak value is adjusted by decreasing the number of units to be simultaneously turned ON in the switching transistors Tr41 to Tr46 connected in parallel to each other in the low impedance circuit 20. Two units of switching transistor which are simultaneously turned ON are switched to any of a pair of Tr41, 42, a pair of Tr43, 44, or a pair of Tr45, 46 for each one pulse according to switching operation by the simultaneous ON-patterns switching circuit 213.

Also in this case, when the semiconductor switching device 102 in the high impedance circuit 10 is tuned ON according to a control signal onto the high impedance circuit as shown in FIG. 6C, the voltage E1 is applied to the space therebetween as shown in FIG. 6A.

When insulation between the electrodes formed by the tool electrode 1 and the workpiece W is broken down by the voltage E1 and generation of electric discharge is detected, one of the pair of switching transistors Tr41, Tr42, the pair of Tr43, 44, or the pair of Tr45, 46 each in the semiconductor switching device 202 in the low impedance circuit 20 is alternately turned ON for each one pulse, as shown in FIG. 6E to 6G, according to a control signal onto the low impedance circuit as shown in FIG. 6D.

With the above operation, a current with a low peak value as indicated by the solid line in FIG. 6B flows to the space therebetween.

Accordingly, it is possible to variably control a current peak value of a current flowing between the electrodes formed by the electrode and the workpiece by variably controlling the switching transistors Tr41 to 46 connected in parallel to each other in the low impedance circuit 20 to a specified number of units to be simultaneously turned ON in a specified pattern thereof, and even in a case where the number of switching devices to be simultaneously turned ON is decreased, all of the switching transistors can be turned ON/OFF in turn, and for this reason it is possible to prevent such a situation where only a particular switching transistor is turned ON/OFF, so that the life of the switching transistors Tr41 to 46 is not shortened and nonuniformity of a current peak between machines can be suppressed, whereby better reproducibility of machining conditions can be achieved.

As nonuniformity of a current peak between machines can be suppressed, reproducibility of machining conditions in each of the machines can also be improved.

The control upon ON-time is executed by the ON-time control unit 212 in the same manner as that in a case of Embodiment 1. Accordingly, in Embodiment 2, the same effects can also be obtained as in a case of Embodiment 1.

Figure 7:
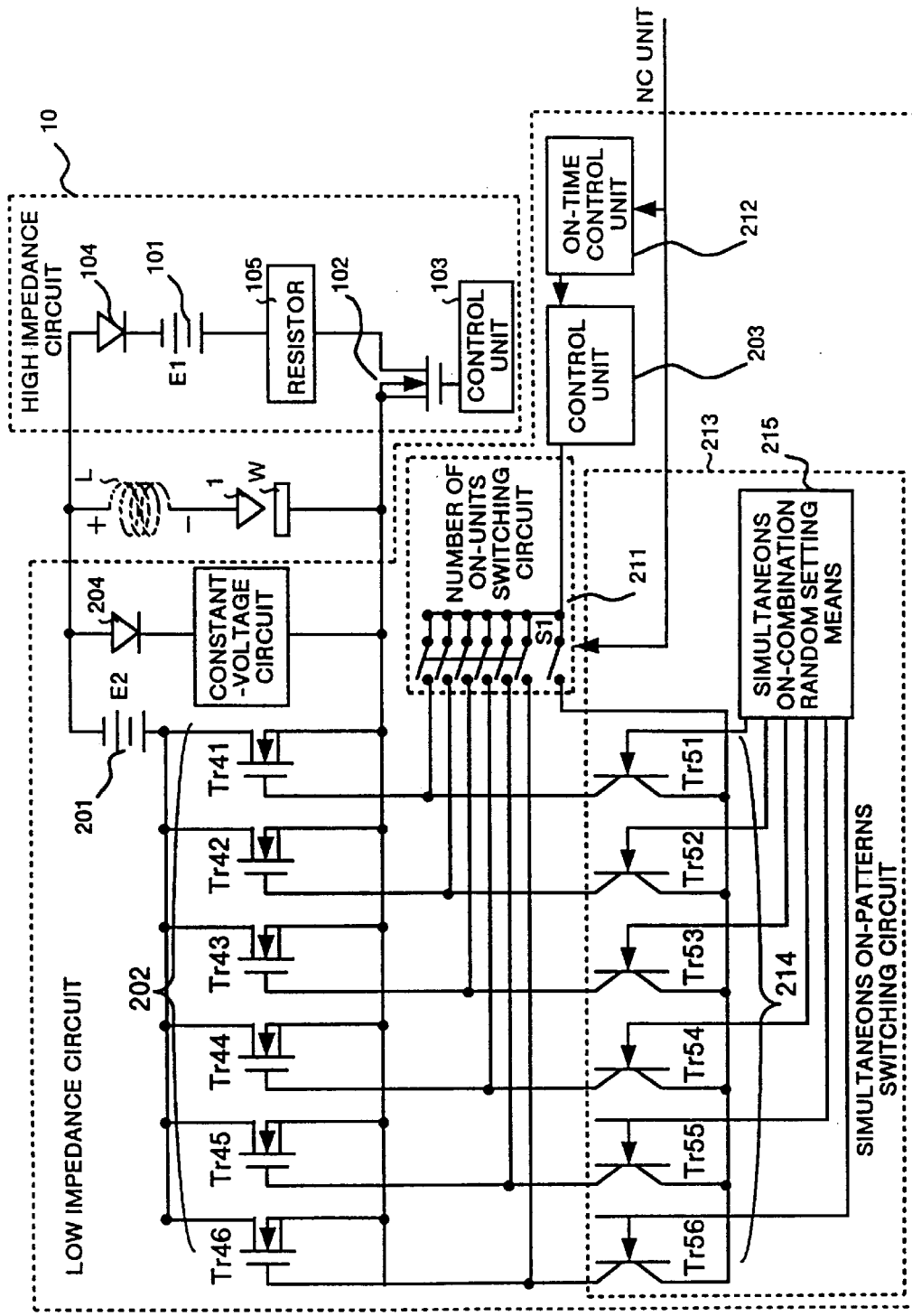
FIG. 7 is a circuit diagram showing Embodiment 3 of the power supply apparatus for an electric discharge machine according to the present invention.
Figure 8:
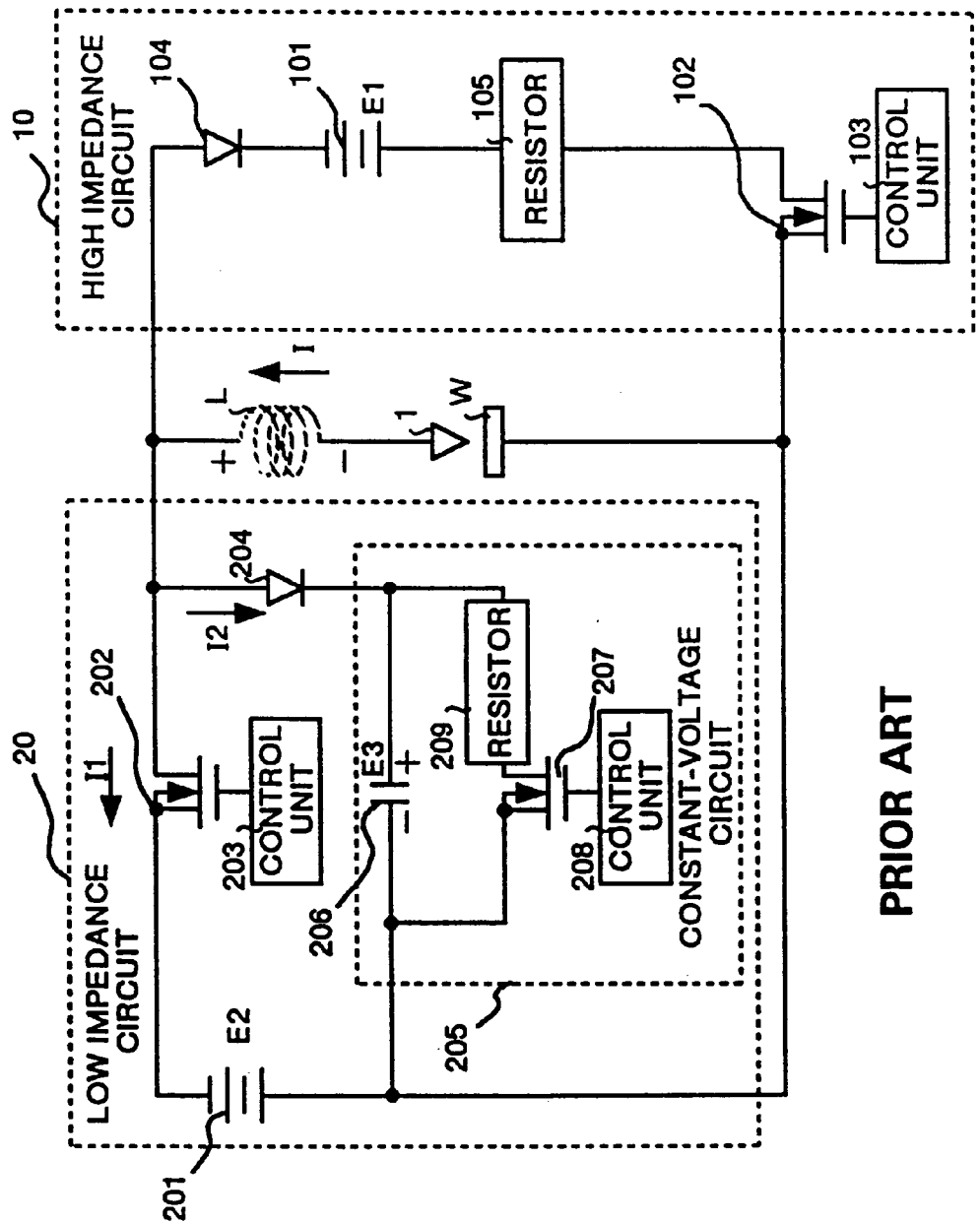
FIG. 8 is a circuit diagram showing the example based on the conventional technology of the power supply apparatus for an electric discharge machine.
Figure 11:
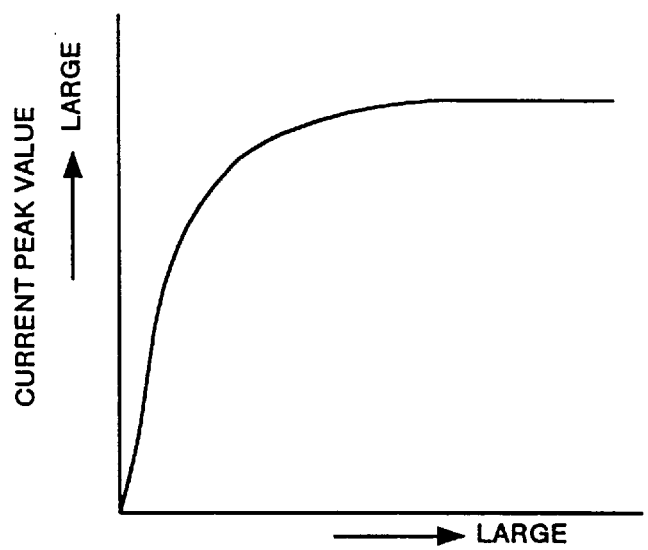
FIG. 11 is a graph showing a relation between the number of switching devices to be simultaneously turned ON and the current peak values.
Figure 12:
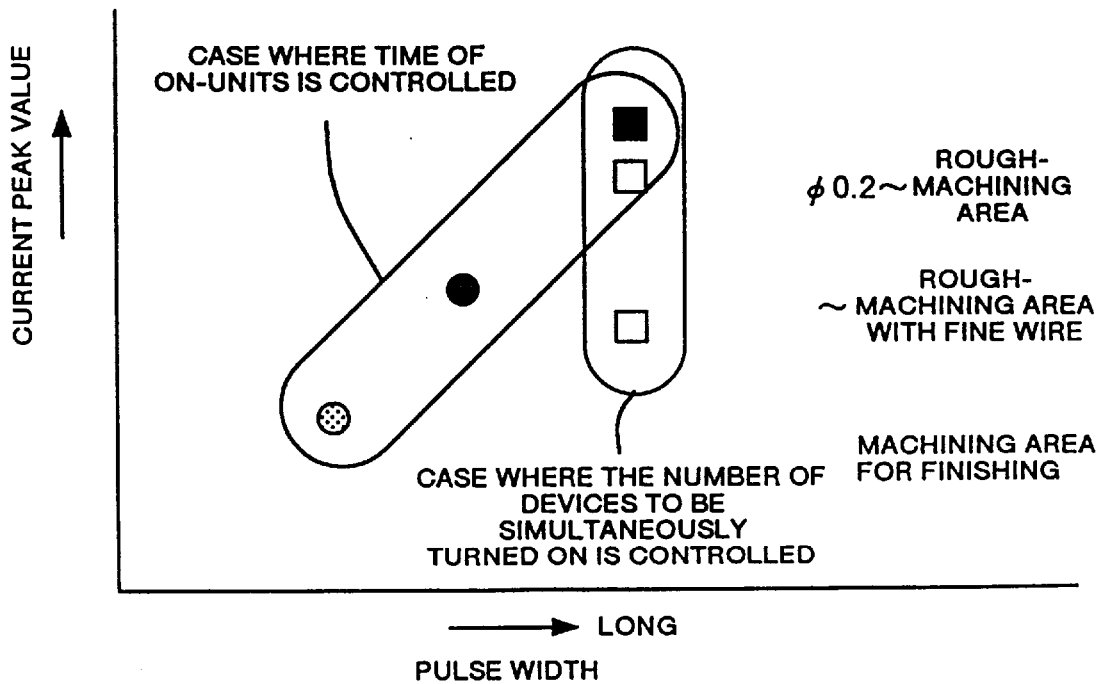
FIG. 12 is a graph showing a relation between current peak values and machining conditions.

FIG. 7 shows Embodiment 3 of the power supply apparatus for an electric discharge machine (a wire electric discharge machine) according to the present invention. It should be noted that, in FIG. 7, the same reference numerals are assigned to the sections corresponding to those in FIG. 1 and FIGS. 2A to 2G, and description thereof is omitted herein.

The number of ON-units switching circuit 211 switches, like in a case of Embodiment 2, the number of switching transistors Tr41 to Tr46 to be simultaneously turned ON according to an instruction signal from the NC unit which is not shown in the figure, and the number of units to be simultaneously turned ON is set to 2 by the simultaneous ON-pattern switching circuit 213 when only the switch S1 is closed, and the number of units to be simultaneously turned ON is set to 6 (the maximum value) when only the switch S2 is closed.

The simultaneous ON-patterns switching circuit 213 effectively functions when only the switch S1 in the number of ON-units switching circuit 211 is closed and the number of units to be simultaneously turned ON is 2.

The simultaneous ON-patterns switching circuit 213 comprises a gate control transistor switch 214 comprising gate control transistors Tr51 to 56 for discretely turning ON/OFF each gate voltage in the switching transistors Tr41 to 46 in the semiconductor switching device 202, and a simultaneous ON-combination random setting means 215 for turning ON a random combination with any two units among the gate control transistors Tr51 to 56 using random numbers, in other words, for setting at random any combination with any of the switching devices 202 (switching transistors Tr41 to 46) which are simultaneously turned ON.

Next description is made for operations in Embodiment 3.

In a case where a machining condition requiring a high peak current is selected by the NC unit, like in a case of Embodiment 2, the switch S2 in the number of ON-units switching circuit 211 is closed, the number of units to be simultaneously turned ON is set to the maximum value, and all of the switching transistors Tr41 to Tr46 in the low impedance circuit 20 is simultaneously controlled to be ON or OFF, so that a large current is supplied to a space between the electrodes. With this operation, a high peak current is supplied to the space therebetween.

In a case where a machining condition requiring a low peak current is selected by the NC unit, the switch S1 in the number of ON-units switching circuit 211 is closed, the simultaneous ON-combination random setting means 215 in the simultaneous ON-patterns switching circuit 213 random sets a combination with any two units among the switching transistors Tr41 to 46 which are simultaneously turned ON for each one pulse, and the corresponding switching devices 202 (switching transistors Tr41 to 46) are turned ON by two units for each time.

The combination is set for at random each one pulse so as to be a pair of Tr43, 45, a pair of Tr42, 44, or a pair of Tr41, 46.

With the above operation, a low peak current is supplied to the space between the electrodes, and for this reason it is possible to prevent such a situation that only a particular switching transistor is turned ON/OFF, and, in addition to the fact that the life of the switching transistors Tr41 to 46 is not shortened, it is possible to reduce generation of nonuniformity in a current peak obtained by turning ON the switching transistors Tr41 to 46 by two units for each time because of presence of nonuniformity in characteristics of the switching transistors Tr41 to 46.

With the operations, generation of a difference in a machining amount from another for each one pulse can be reduced, whereby machining characteristics can be stabilized.

It should be noted that the control upon ON-time is executed by the ON-time control unit 212 in the same manner as that in a case of Embodiment 1. Accordingly, in Embodiment 3, the same effects can also be obtained as in a case of Embodiment 1.

It should be noted that, in the embodiment, the number of switching devices connected in parallel to each other is set to 6, but, it is needless to say that the same effects can be obtained even in a case where the number is set to n units. In addition, even the number of switching devices to be simultaneously turned ON is m-units, no trouble will occur thereby. Also, in the embodiment, ON-time of the switching devices is switched by hardware configuration, but it is also possible to switch it by software switch provided in a control unit in an NC unit or the like.

It is also possible to realize more effectively the object of the present invention by controlling a supply voltage value of the switching circuit in the power supply apparatus in addition to the configuration according to the embodiment.

As understood from the above description, with the power supply apparatus for an electric discharge machine according to the present invention, the number of ON-units switching means controls the number of switching devices to be simultaneously turned ON, and the ON-time control unit variably controls ON-time of the switching devices, so that a current peak value can changeably be controlled for a machining condition requiring a low current peak although it is a machining power unit for a high peak current, deposition of an electrode material onto a workpiece or the like hardly occurs and a machining speed is improved as compared to the power supply apparatus based on the conventional technology, and in addition, the machining power unit for a high current peak can be used as a machining power unit for a low current peak for a finishing condition or a fine area or the like without degradation of the machining characteristics, so that significant effects can be obtained in aspects of cost and space saving thereof.

With the power supply apparatus for an electric discharge machine according to another feature of the present invention, the simultaneous ON-patterns switching means switches and uses switching devices to be turned ON thereby in a case where the switching devices to be simultaneously turned ON are restricted by the number of ON-units switching means, so that it is possible to prevent such a situation that only a particular switching transistor is turned ON/OFF, and for this reason, the life of switching transistors is not shortened and nonuniformity of a current peak between machines can be suppressed, whereby better reproducibility of machining conditions can be achieved.

With the power supply apparatus for an electric discharge machine according to another feature of the present invention, the simultaneous ON-combination random setting means random sets a combination of switching devices to be simultaneously tuned ON, so that nonuniformity of a current peak can be suppressed, whereby machining characteristics can be more stabilized.

This application is based on Japanese patent application No. HEI 9-121284 filed in the Japanese Patent Office on May 12, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A power supply apparatus for an electric discharge machine including an electrode opposite a workpiece with a specified gap therebetween, said power supply apparatus comprising:

a first power supply device connected to the electrode and workpiece comprising a high impedance circuit connected in series to a DC power supply unit; and a second power supply device connected to the electrode and workpiece comprising a low impedance circuit connected to a power source;

wherein the power supply apparatus intermittently applies a pulse voltage between the electrode and workpiece from said first power supply device, and also supplies a machining current between said electrode and workpiece from said second power supply device after generation of electric discharge.

2. A power supply apparatus for an electric discharge machine according to claim 1 comprising:

a plurality of switching units connected in parallel;

a number of ON-units switching circuit, connected to said plurality of switching units for controlling the number of said plurality of switching units to be simultaneously turned ON; and a simultaneous ON-Patterns switch, connected to said plurality of switching units and number of ON-units switching circuit for switching and using switching units to be simultaneously turned ON when the switching units to be turned ON are restricted by said number of ON-units switching circuit.

3. A power supply apparatus for an electric discharge machine according to claim 2; wherein said simultaneous ON-patterns switch comprises a simultaneous ON-combination random setting section for at random setting a combination of switching elements to be simultaneously tuned ON.

4. A power supply apparatus for an electric discharge machine according to claim 1, wherein said second power supply device comprises:

a plurality units of switching elements connected in parallel to each other;

the number of ON-units switch for controlling the number of said switching elements to be simultaneously turned ON; and an ON-time controller for variably controlling ON-time of said switching devices.

5. A power supply apparatus for an electric discharge machine according to claim 4 comprising:

a simultaneous ON-Patterns switch, connected to said low impedance circuit, for switching and using switching elements to be simultaneously turned ON when the switching elements to be turned ON are restricted by said number of ON-units switch.

6. A power supply apparatus for an electric discharge machine according to claim 5; wherein said simultaneous ON-patterns switch comprises a simultaneous ON-combination random setting section for at random setting a combination of switching elements to be simultaneously tuned ON.

* * * * *